(12) United States Patent
Bodin et al.

(10) Patent No.: US 9,535,723 B2
(45) Date of Patent: Jan. 3, 2017

(54) METHODS AND APPARATUSES FOR GENERATING DESKTOP CLOUD INSTANCES BASED UPON MOBILE DEVICE USER FILE SELECTIONS

(71) Applicants: William K. Bodin, Austin, TX (US); Thomas E Cook, Essex Junction, VT (US); David Jaramillo, Lake Worth, FL (US); Neil A Katz, Parkland, FL (US)

(72) Inventors: William K. Bodin, Austin, TX (US); Thomas E Cook, Essex Junction, VT (US); David Jaramillo, Lake Worth, FL (US); Neil A Katz, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/186,261

(22) Filed: Feb. 21, 2014

(65) Prior Publication Data

US 2015/0242436 A1     Aug. 27, 2015

(51) Int. Cl.
 *G06F 17/30* (2006.01)
 *G06F 9/445* (2006.01)
 *G06F 9/455* (2006.01)
 *G06F 9/44* (2006.01)

(52) U.S. Cl.
 CPC ............. *G06F 9/445* (2013.01); *G06F 9/4445* (2013.01); *G06F 9/45558* (2013.01); *G06F 17/30197* (2013.01); *G06F 2009/45562* (2013.01)

(58) Field of Classification Search
 None
 See application file for complete search history.

(56) References Cited

U.S. PATENT DOCUMENTS

| 7,912,822 | B2 | 3/2011 | Bethlehem et al. |
| 2009/0182955 | A1 | 7/2009 | Cherukuri |
| 2009/0276771 | A1 | 11/2009 | Nickolov et al. |
| 2010/0106804 | A1 | 4/2010 | He et al. |
| 2011/0131330 | A1 | 6/2011 | Beaty et al. |
| 2011/0209064 | A1 | 8/2011 | Jorgensen et al. |
| 2012/0192078 | A1 | 7/2012 | Bai et al. |
| 2012/0297311 | A1* | 11/2012 | Duggal ............... G06F 9/468 715/740 |
| 2014/0058938 | A1* | 2/2014 | McClung, III ....... G06Q 20/227 705/41 |

(Continued)

OTHER PUBLICATIONS

Guo et al., "Jupiter: Transparent Augmentation of Smartphone Capabilities through Cloud Computing", MobiHeld '11: Proceedings of the 3rd ACM SOSP Workshop on Networking, Syste.

(Continued)

*Primary Examiner* — Jay Morrison
(74) *Attorney, Agent, or Firm* — Harrington & Smith; Louis J. Percello

(57) ABSTRACT

A mobile device accepts a selection of a file for opening or editing or both. The file is associated with a file type. A mobile application on the mobile device identifies the file type associated with the file. A request message is constructed that is indicative of the file type and one or more user credentials. The request message is sent to a cloud server. The mobile device receives an address for a selected cloud image from the cloud server and, in response thereto, connects to a remote processing environment in the selected cloud image.

22 Claims, 5 Drawing Sheets

(56) References Cited

U.S. PATENT DOCUMENTS

2015/0058286 A1* 2/2015 Leibovici .............. G06F 9/5055
　　　　　　　　　　　　　　　　　　　　　　707/610

OTHER PUBLICATIONS

Zhang et al., "Towards an Elastic Application Model for Augmenting the Computing Capabilities of Mobile Devices with Cloud Computing", Mobile Networks and Applications, Volume.
Chun et al., "Augmented Smartphone Applications Through Clone Cloud Execution", HotOS'09: Proceedings of the 12th conference on Hot topics in operating systems, May 2009.

* cited by examiner

_METHODS AND APPARATUSES FOR GENERATING DESKTOP CLOUD INSTANCES BASED UPON MOBILE DEVICE USER FILE SELECTIONS_

BACKGROUND

Technical Field

The exemplary and non-limiting embodiments of the invention relate generally to cloud computing and, more particularly, to generating desktop cloud instances based upon mobile device user file selections.

Brief Description of Prior Developments

We are moving from a world in which individuals use a single computing device with a single type of data to a world in which individuals use many different computing devices with a variety of different data types. One significant problem is the need to not only view, but also to manipulate files of a plurality of different data types from all of these different computing devices. In many situations, there is a mismatch of data and computing capability. Users have a set of data that they need to manipulate, but they do not have the correct device needed to manipulate the data. Mobile, smartphone, and tablet devices are not powerful enough, nor do they contain the correct user interfaces to run applications that are configured for manipulating complex data. Depending upon the specific devices that are currently available, a user may or may not have the capability of opening and manipulating certain types of files.

BRIEF SUMMARY

The following summary is merely intended to be exemplary. The summary is not intended to limit the scope of the claims.

In accordance with one aspect of the invention, a method comprises a mobile device accepting a selection of a file for opening or editing or both, wherein the file is associated with a file type. A mobile application on the mobile device identifies the file type associated with the file. A request message is constructed that is indicative of the file type and one or more user credentials. The request message is sent to a cloud server. The mobile device receives an address for a selected cloud image from the cloud server and, in response thereto, connects to a remote processing environment in the selected cloud image. The remote processing environment may comprise, for example, a virtual desktop.

In accordance with another aspect of the invention, an apparatus comprises one or more processors and one or more memories including computer program code. The one or more memories and the computer program code are configured, with the one or more processors, to cause the apparatus to accept a selection of a file for opening or editing or both, wherein the file is associated with a file type. An application on the apparatus identifies the file type associated with the file. A request message is constructed that is indicative of the file type and one or more user credentials. The request message is sent to a cloud server. The apparatus receives an address for a selected cloud image from the cloud server and, in response thereto, connects to a remote processing environment in the selected cloud image.

In accordance with another aspect of the invention, a method comprises a cloud server receiving a request message from a mobile device, wherein the request message is indicative of a file type and one or more user credentials. In response to the request message the cloud server selects a cloud image from a plurality of cloud images based upon the file type. The cloud server connects the selected cloud image to the one or more user credentials and connects a files system of the mobile device to the cloud server. The cloud server sends a response to the mobile device indicative of an address for the selected cloud image.

In accordance with another aspect of the invention, an apparatus comprises one or more processors and one or more memories including computer program code. The one or more memories and the computer program code are configured, with the one or more processors, to cause the apparatus to receive a request message from a mobile device, wherein the request message is indicative of a file type and one or more user credentials. In response to the request message, the apparatus selects a cloud image from a plurality of cloud images based upon the file type. The apparatus connects the selected cloud image to the one or more user credentials and connects a files system of the mobile device to the apparatus. The apparatus sends a response to the mobile device indicative of an address for the selected cloud image.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
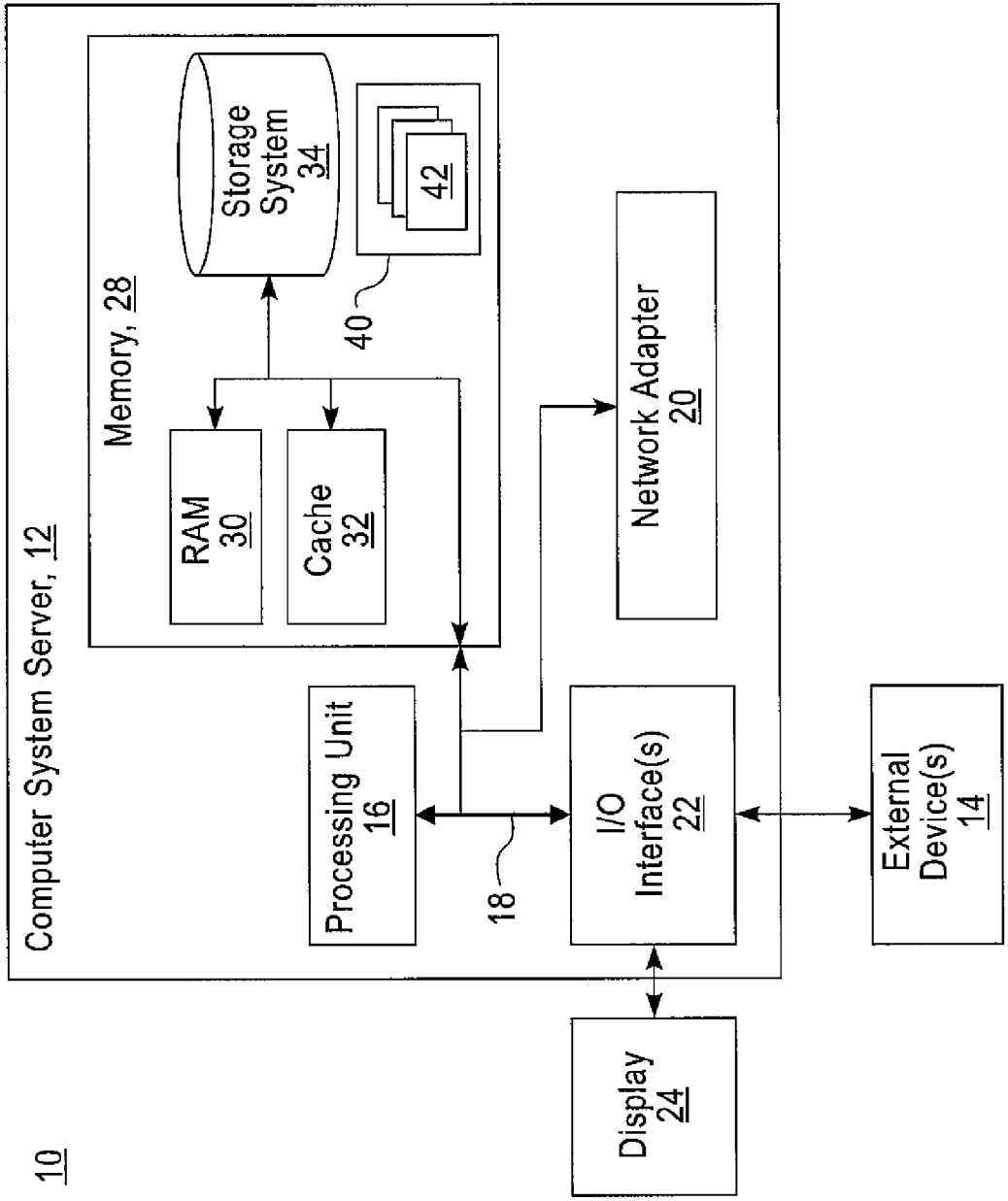
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to a consumer or a user is to utilize the provider's applications running on a cloud infrastructure. The applications are accessible from various client devices through a thin client interface for implementing batch jobs, computationally intensive jobs, simulation-oriented jobs, webhosting services, or other scientific applications. The consumer or user does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load balancing between clouds). According to various exemplary embodiments disclosed herein cloud computing and mobile computing are bound harmoniously. In addition to being applicable to structures with defined locations including public, private, and community, the exemplary embodiments disclosed herein are also applicable to gradient levels of cloud computing services similar to what may be observed with wireless today. For example, an individual visits you at your home, and they can easily take your wireless identification (ID) parameter and your wireless password to have access to your network. Cloud computing may move in the same direction whereby pursuant to various exemplary embodiments disclosed herein, there may be cloud services to open files and manipulate content in the same way as Wi-Fi is provided for free today. We can expect that if you were to visit the person's house and connected to their wireless network, the wireless network could also be a cloud network that provided you with temporal cloud services.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), or from a solid state media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
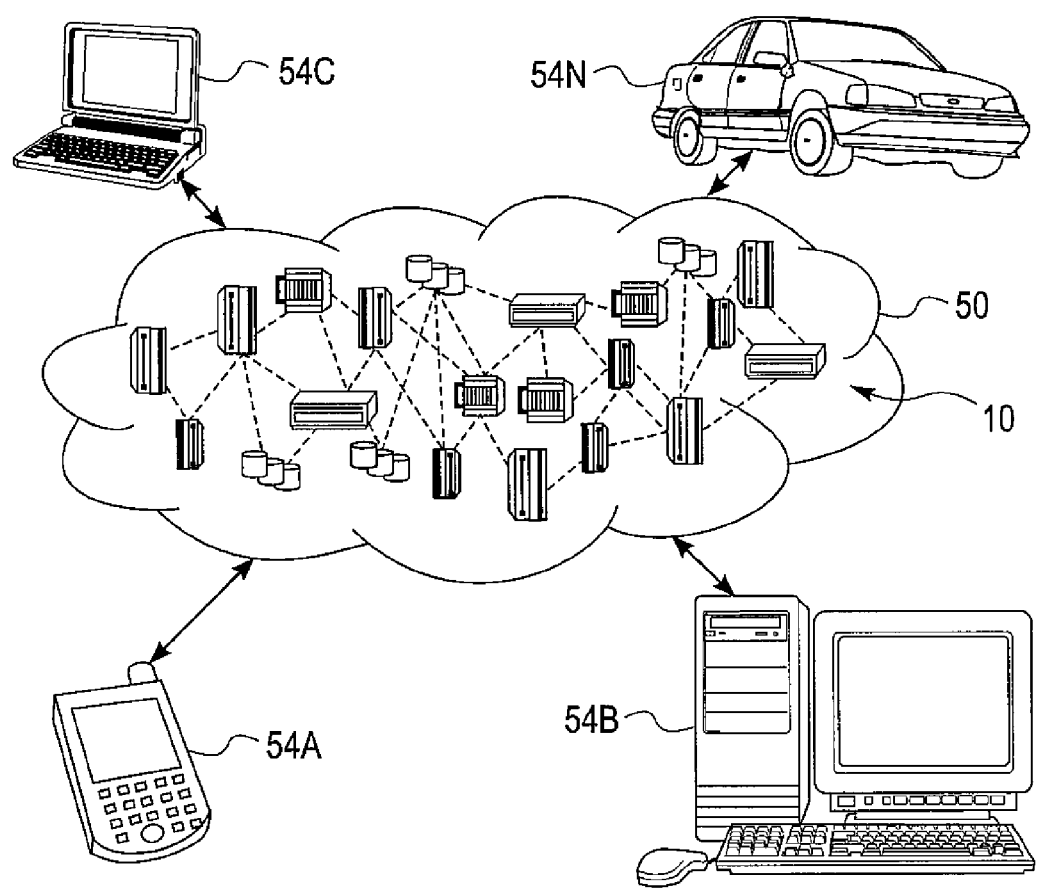
FIG. 2 depicts a cloud computing environment according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. These local computing devices, such as the cellular telephone 54A, may each be considered to include one or more processors which are operatively coupled to a non-transitory computer readable medium.

They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Pursuant to a non-limiting example, the cellular telephone 54A may represent a mobile phone that connects through a car where cloud computing could be provided by the car or other vehicle.

Figure 3:
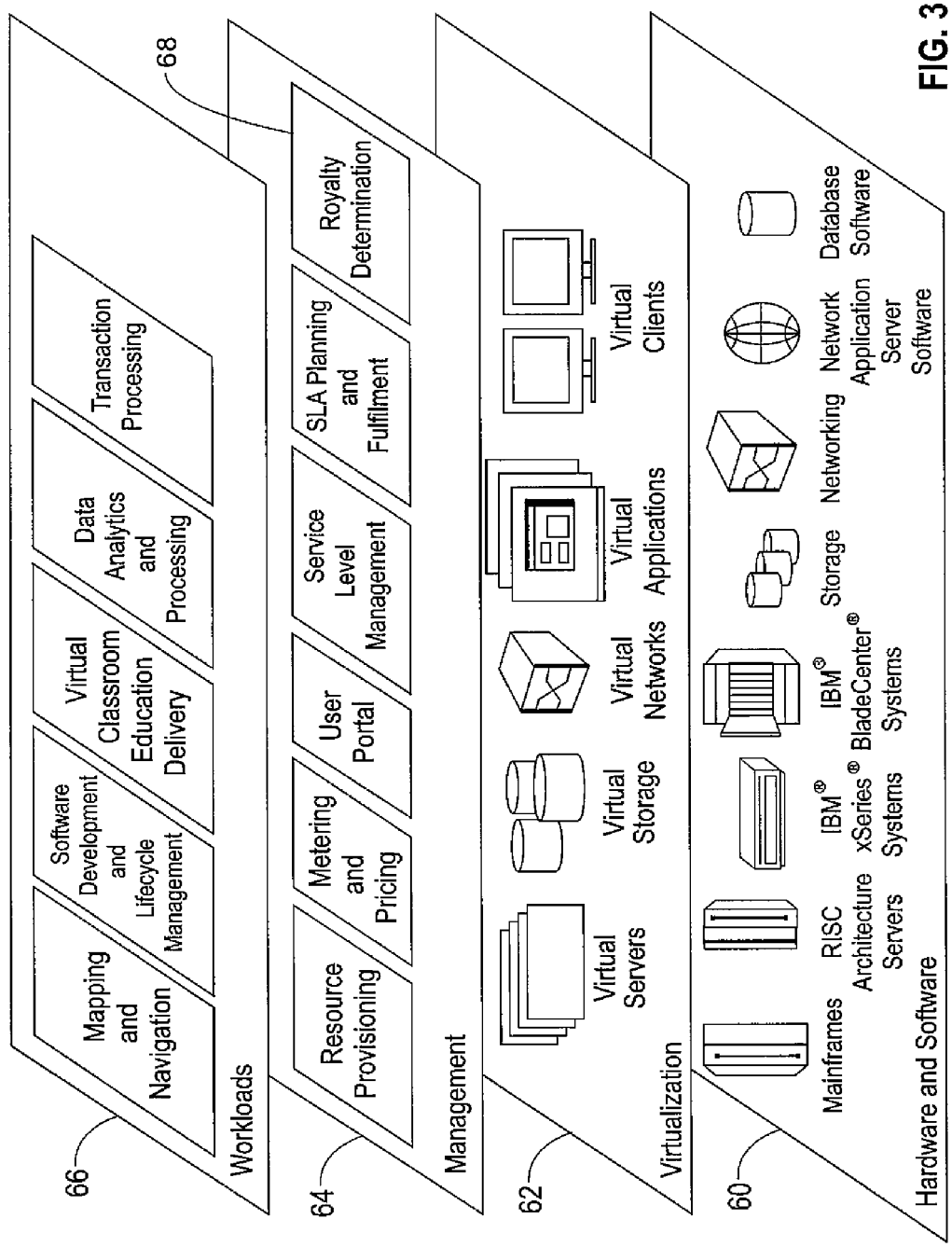
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® ZSERIES® systems; RISC (Reduced Instruction Set Computer) architecture based servers, in one example IBM PSERIES® systems; IBM XSERIES® systems; IBM BLADECENTER® systems; storage devices; networks and networking components. Additional examples for implementing the hardware and software layer 60 include an HPC architecture known as BlueGene/P® in which processors are clustered in groups of 32-node clusters. Jobs are executed on the 32-node clusters that can be accessed through a binary tree structure. It should be understood that the binary tree structure is considered as an illustrative example and could be generalized to comprise a generic tree from another HPC architecture. Illustratively, a single job may run on a contiguous set of clusters only.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Royalty determination 68 may be provided as one of the functions of the management layer 64. Royalty distribution may, but need not, be based on a business-to-business agreement. Thus, royalty distribution can be based on a pre-signed agreement. However, it may be difficult to follow this model for individual contributors on a cloud platform. On a cloud platform, an individual user can contribute to an image or composed service and make it public as a catalog item. Thus, royalty distribution could, but need not, be performed at a finer granularity. Royalty distribution could be performed, for example, at a resource usage level to keep track of individual contributions and contribution value/impact dynamically, and to distribute royalty to the contributors.

For users of desktop computers and laptop computers, the data stored on the computer is consumable by the computer itself. For example, a Microsoft Office™ file may be opened by Microsoft Office™ or Open Office. A CAD (Computer Aided Design) file may be edited with the CAD program installed on the desktop or laptop computer. For each of a plurality of file types stored on the computer, there is an application which may manipulate the data inside of the file. With more connectivity granted by the Internet, data files may often be downloaded to the desktop or laptop computer where the file type associated with the data file is unknown to all applications installed on the computer. Likewise, a cooperative environment may be provided according to various exemplary embodiments disclosed herein, such that, if a mobile device were to open content that it could not handle correctly, the connection would be made to the cloud computing environment, which could be a desktop in the cloud.

Special lightweight viewers have been developed to allow web Browsers to view the contents of some files that are associated with unknown or foreign data types. However, existing lightweight viewers fall short of allowing ubiquitous data manipulation for all unknown or foreign data types.

As smart phones, tablets and other non-desktop and non-laptop computers continue to proliferate in the marketplace, a new phenomena is developing. Instead of having one main computer with applications matching data, individuals are now using a plurality of computing devices which may include a network of personal computers, a smart phone, a tablet, and even a netbook. We are moving from a world of one computer and one set of data to a world of many computing devices and a variety of types of data. One significant problem is the need to not only view, but also to manipulate files of a plurality of different data types from all of these different computing devices.

By way of illustration, assume that a salesperson is about to go into a meeting with an important customer. The salesperson plans to present the material from a tablet computer. At the last moment, the salesperson realizes that a change needs to be made to the presentation materials. A tablet computer will frequently not have a program that will allow a user to change viewgraphs and charts; the user will only have the ability to view and present these viewgraphs and charts. Another example is a mobile user who uses their smart phone and docking station as their main computer. The user desires to edit a CAD file to change an architectural fixture for a building, but the user's smart phone does not have the ability to open a CAD file.

In both of the foregoing examples, there is a mismatch of data and computing capability. Users have a set of data that they need to manipulate, but they do not have the correct device needed to manipulate the data. Mobile, smartphone, and tablet devices are not powerful enough, nor do they contain the correct user interfaces to run applications that are configured for manipulating complex data. In some situations, it may be desired to restrict users from accessing certain data. Yet in general, it would be desirable to provide users of multiple devices with the capability of manipulating various types of data, regardless of the device that is currently available.

According to a set of illustrative embodiments described herein, customized remote workstations hosted on cloud computing platforms are instantiated automatically when a user attempts to open and manipulate a file or content or both on a mobile device. A file type associated with the file, and/or the data included in the file, enables a cloud computing manager to determine which of a plurality of remote workstation instance templates should be used to open the file. Instances may be a template of Windows, Linux, AIX, Mac OS, or other operating systems. Optionally, templates may be provided in a plurality of sizes including, for example, small, medium, and large, that each have a specific set of applications installed. Based on a user ID corresponding to a mobile device user, the instances could also have automatically provisioned access to classified applications and data what are not secure on a mobile device.

Figure 4:
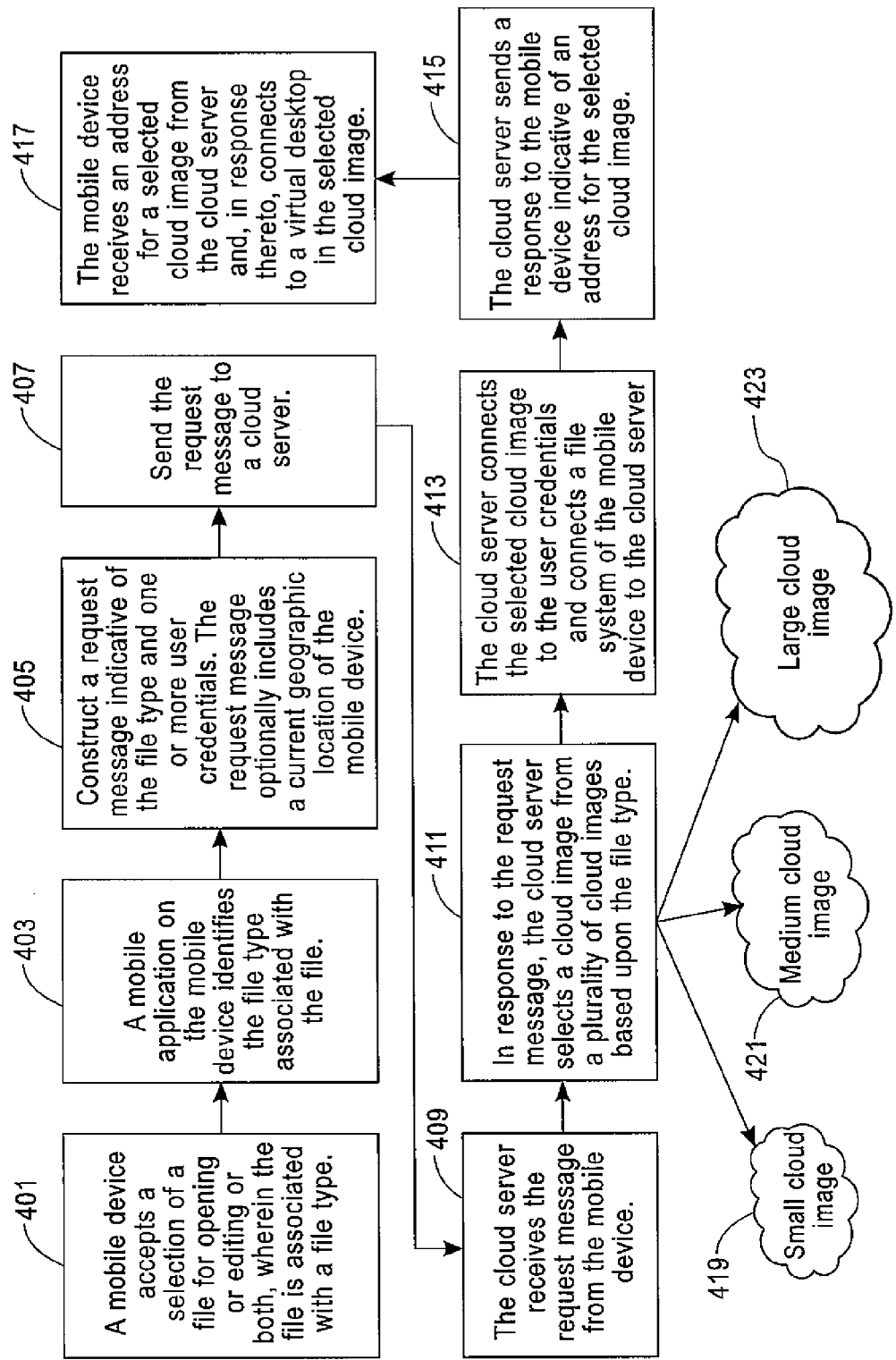
FIG. 4 is a flowchart illustrating a first exemplary method according to a set of embodiments of the present invention.

FIG. 4 is a flowchart illustrating a first exemplary method according to a set of embodiments of the present invention. The operational sequence commences at block 401 where a mobile device accepts a selection of a file for opening or editing or both, wherein the file is associated with a file type. Next, at block 403, a mobile application on the mobile device identifies the file type associated with the file. A request message is constructed that is indicative of the file type and one or more user credentials (block 405). The request message is sent to a cloud server (block 407). The mobile device receives an address for a selected cloud image from the cloud server and, in response thereto, connects to a virtual desktop in the selected cloud image (block 417).

For purposes of illustration, blocks 401, 403, 405, 407, and 417 are performed by the mobile device, whereas blocks 409, 411, 413 and 415 are performed by the cloud server. An example of a cloud server is the computer system/server 12 previously discussed in connection with FIG. 1. Returning to FIG. 4, at block 409, the cloud server receives a request message from a mobile device, wherein the request message is indicative of a file type and one or more user credentials. In response to the request message, the cloud server selects a cloud image from a plurality of cloud images based upon the file type (block 411). The cloud server connects the selected cloud image to the one or more user credentials and connects a files system of the mobile device to the cloud server (block 413). The cloud server sends a response to the mobile device indicative of an address for the selected cloud image (block 415).

Illustratively, the plurality of cloud images may include a small cloud image 419, a medium cloud image 421, and a large cloud image 423. Each of respective cloud images 419, 421, 423 may be configured to enable opening and/or editing of a corresponding file type or types. Alternatively or additionally, each of respective cloud images 419, 421, 423 may be configured to enable opening and/or editing of particular file sizes.

Computational devices, computers, and data have traditionally been tightly coupled. If there is a need to manipulate office files, one classic model is to use a Microsoft™ operating system equipped with Microsoft Windows™ applications. If there is a need to manipulate images or perform light movie editing, a suitable choice may be an Apple Macintosh™ computer. Specialized hardware may also be employed, such as high-performance video cards for accelerating graphics rendering on CAD programs. Alternatively or additionally, Advanced RISC (reduced instruction set computer) Machine (ARM) cloud systems may be used to handle an incoming request, or another cell phone in the cloud may be configured to handle the incoming request.

According to a set of illustrative embodiments of the invention, file types and/or data types are decoupled from the capabilities of specific devices by using the cloud computing techniques described in conjunction with FIG. 4. For example, taking the salesman example presented previously, the salesman has a file type in the form of a CAD drawing on a mobile tablet computer. The salesman needs to edit the CAD file to make a change for a customer. Although the file size is not large, the compact vector information in the file data is difficult for a mobile device to render. The salesman enters a request to open the CAD file on their mobile device. The mobile application, illustratively a mobile cloud agent, recognizes the CAD file type and determines that this file type cannot be opened adequately on the mobile device. The mobile cloud agent contacts a remote cloud server agent to rapidly instantiate a cloud image, or provision a cloud image from a waiting pool of ready clouds, as a remote desktop which is configured to be powerful enough to manipulate CAD data. The cloud image may have an attached hardware accelerator for rendering graphical artifacts.

Optionally, company specific external CAD libraries may be mounted. For example, the files system on the mobile device may be mounted over a network onto the cloud image. Pursuant to a set of illustrative embodiments described herein, the cloud may include a plurality of cached remote workstations in the cloud, such that the cloud image is immediately available, or available substantially in real time. The user on the tablet may be presented with a remote desktop window to a cloud system. Since the cloud server was given the file name to open upon instantiation, the cloud image starts the application associated with the CAD file and transfers the CAD file from the shared storage with the mobile device to the cloud image.

Since the only task that the mobile device needs to perform is to reflect the screen images from the cloud CAD application, the user experience is adequate. The user on the tablet computer may execute complex graphical transformations on the CAD data. The cloud computer absorbs the complexity of manipulating the CAD data and leveraging server-side hardware acceleration, while the tablet renders simple pixels sent over the network. The user saves the changes, the CAD file is updated on the mobile device, and the cloud image is then destroyed for security reasons.

Remotely connecting to a server via a terminal such as a tablet is not new. In fact, this is a very classic computing model. However, pursuant to a set of illustrative embodiments disclosed herein, the automatic and dynamic selection of a cloud type and capability is performed based on the data residing on a mobile device. By leveraging cloud computing, it is possible to select from a range of different remote systems keying off the data on a mobile device. For CAD data, perhaps a Windows or AIX cloud system may be selected. If the data required special libraries to manipulate, a cloud image with those special libraries already mounted may be selected. For developers, code snippets contained on their mobile device may require an entire application development environment for which a custom cloud image may be selected. A connection may be made to one or more customer-specific cloud images in response to a geographic location of a user or employee closely matching a set of GPS coordinates corresponding to a particular customer. By decoupling the data encapsulated on mobile devices and adding in the intelligence to instantiate specialized cloud images based on data, location, or user, the conventional approach of having a one-to-one match of data to computer is eliminated. The methods shown in FIG. 4 may be used to provide access to files on virtually any computing device, greatly enhancing the user experience with smartphones and tablet devices. Alternatively or additionally, the operational sequence of FIG. 4 may apply, for example, to cloud servers such as a CAD cloud or an office cloud.

Figure 5:
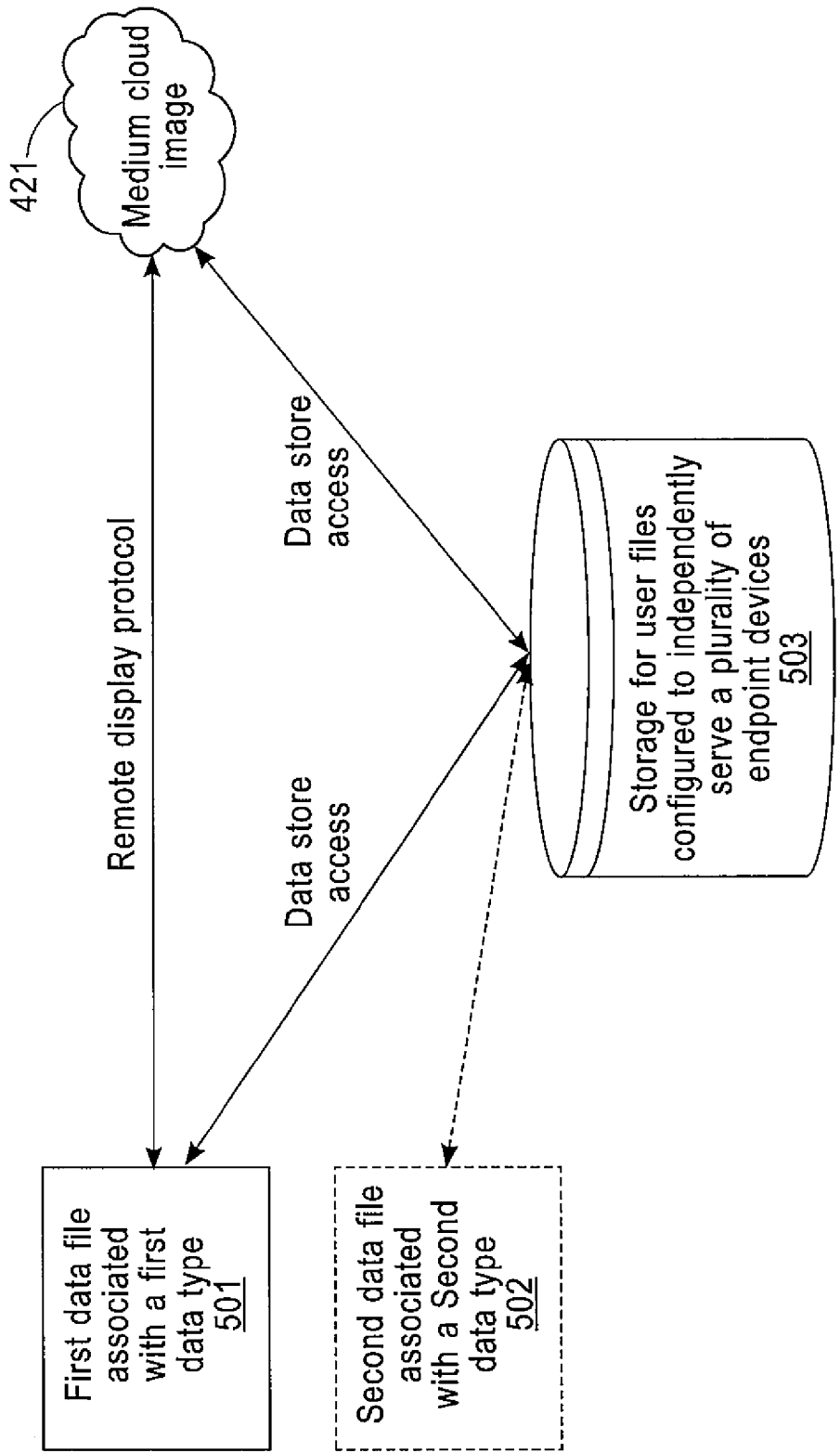
FIG. 5 is a flowchart illustrating a second exemplary method according to a set of embodiments of the present invention.

FIG. 5 is a flowchart illustrating a second exemplary method according to a set of embodiments of the present invention. The method of FIG. 5 provides an illustration of how a cloud image for a particular file opening or file editing event may be initiated. For example, medium cloud image 421 is initiated in response to an apparatus such as a mobile device accepting a request to open or to edit a first data file associated with a first data type 501. The first data file associated with the first data type 501, as well as a second data file associated with a second file data type 502, may be stored in a non-transitory computer-readable memory of the apparatus. A tight coupling between the cloud server and the apparatus may be provided. For example, a shared file system where files or content is accessible both mobile, desktop, and server devices; like MyMobileHub, GSA, or Connections Files could be used to automatically commute files across platforms. The apparatus opens a file that appears to be on the apparatus itself, but the file is really in storage for user files configured to independently serve a plurality of endpoint devices 503. The storage for user files configured to independently serve a plurality of endpoint devices 503 is operatively coupled to a storage server connected to a Cloud upon instantiation of the medium cloud image 421. After the user of the apparatus is connected and completes their work, the cloud image may be destroyed for security reasons. A new, fresh cloud image may be prepared for a subsequent request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   accepting, on a mobile device, a selection of a file for opening or editing or both, wherein the file is associated with a file type;
   identifying the file type associated with the file;
   constructing a request message that is indicative of the file type, capabilities of the mobile device, and one or more user credentials;
   sending the request message to a cloud server;
   receiving an address for a cloud image from the cloud server, wherein the cloud image is selected from a remote system of a plurality of remote systems based on the credentials and the capabilities of the mobile device, and, in response thereto, connecting to a remote processing environment, decoupled from the capabilities of the mobile device, in the selected cloud image;
   instantiating the selected cloud image on the mobile device; and
   keying off data on the mobile device, processing the cloud image, wherein a one-to-one match of data between the remote system and the mobile device is not required.

2. The method of claim 1 further comprising constructing the request message only in response to determining that the accepted selection of the file cannot be opened or edited.

3. The method of claim 1, wherein the user credentials comprise one or more of a user identity, an identifier for the mobile device, or a current geographic location for the mobile device.

4. The method of claim 1 further comprising providing the selected cloud image with an attached hardware accelerator for rendering graphical artifacts.

5. The method of claim 1 wherein the selected cloud image is selected from among a plurality of customer-specific cloud images in response to a geographic location of a user or employee closely matching a set of GPS coordinates corresponding to a particular customer.

6. The method of claim 1, where the cloud image is configured to enable opening and/or editing of a particular file size and/or of a corresponding file type or types.

7. An apparatus comprising: one or more processors and one or more memories including computer program code, the one or more memories and the computer program code being configured, with the one or more processors, to cause the apparatus to perform at least:
   accepting a selection of a file for opening or editing or both, wherein the file is associated with a file type;
   identifying the file type associated with the file;
   constructing a request message that is indicative of the file type, capabilities of the apparatus, and one or more user credentials;
   sending the request message to a cloud server;
   receiving an address for a cloud image from the cloud server, wherein the cloud image is selected from a remote system of a plurality of remote systems based on the credentials and the capabilities of the apparatus, and, in response thereto, connecting to a remote processing environment, decoupled from the capabilities of the apparatus, in the selected cloud image;
   instantiating the selected cloud image on the apparatus; and
   keying off data on the apparatus, processing the cloud image, wherein a one-to-one match of data between the remote system and the apparatus is not required.

8. The apparatus of claim 7 further comprising computer program code for constructing the request message only in response to determining that the accepted selection of the file cannot be opened or edited.

9. The apparatus of claim 7 wherein the apparatus comprises a mobile device.

10. The apparatus of claim 9 wherein the user credentials comprise one or more of: a user identity, an identifier for the mobile device, or a current geographic location of the mobile device.

11. The apparatus of claim 7 further comprising computer program code for providing the selected cloud image with an attached hardware accelerator for rendering graphical artifacts.

12. The apparatus of claim 7 wherein the selected cloud image is selected from among a plurality of location optimized cloud images in response to a geographic location of a user or employee closely matching a set of GPS coordinates corresponding to a particular customer.

13. A method comprising:
   receiving a request message from a mobile device that is indicative of a file type, capabilities of the mobile device, and one or more user credentials;
   in response to the request message, selecting a cloud image from a plurality of cloud images based upon the file type and the capabilities of the mobile device;
   connecting the selected cloud image to the one or more user credentials and connecting to a file system associated with the mobile device; and
   sending a response to the request message indicative of an address for the selected cloud image for instantiating the selected cloud image on the mobile device for processing the cloud image, decoupled from the capabilities of the mobile device but keying off data on the mobile device, wherein a one-to-one match of data between the remote system and the mobile device is not required.

14. The method of claim 13 wherein the receiving, selecting, connecting, and sending are performed by a cloud server.

15. The method of claim 13 wherein the user credentials comprise one or more of: a user identity, an identifier for a mobile device, or a current geographic location of the mobile device.

16. The method of claim 13 further comprising providing the selected cloud image with an attached hardware accelerator for rendering graphical artifacts.

17. The method of claim 13 wherein the selected cloud image is selected from among a plurality of customer-specific cloud images in response to a geographic location of a user or employee closely matching a set of GPS coordinates corresponding to a particular customer.

18. An apparatus comprising: one or more processors and one or more memories including computer program code, the one or more memories and the computer program code being configured, with the one or more processors, to cause the apparatus to perform at least:
   receiving a request message from a mobile device that is indicative of a file type, capabilities of the mobile device, and one or more user credentials;
   in response to the request message, selecting a cloud image from a plurality of cloud images based upon the file type and the capabilities of the mobile device;
   connecting the selected cloud image to the one or more user credentials and connecting to a file system associated with the mobile device; and
   sending a response to the request message indicative of an address for the selected cloud image for instantiating the selected cloud image on the mobile device for processing the cloud image, decoupled from the capabilities of the mobile device but keying off data on the mobile device, wherein a one-to-one match of data between the remote system and the mobile device is not required.

19. The apparatus of claim 18 wherein the apparatus comprises a cloud server.

20. The apparatus of claim 18 wherein the user credentials comprise one or more of: a user identity, an identifier for a mobile device, or a current geographic location of the mobile device.

21. The apparatus of claim 18 further comprising computer program code for providing the selected cloud image with an attached hardware accelerator for rendering graphical artifacts.

22. The apparatus of claim 18 wherein the selected cloud image is selected from among a plurality of customer-specific cloud images in response to a geographic location of a user or employee closely matching a set of GPS coordinates corresponding to a particular customer.

\* \* \* \* \*